US012386859B2

(12) United States Patent
Shah et al.

(10) Patent No.: US 12,386,859 B2
(45) Date of Patent: Aug. 12, 2025

(54) FAULT TOLERANT STORAGE OF DATA

(71) Applicant: Pacaso Inc., Cincinnati, OH (US)

(72) Inventors: Daivak Sunil Shah, Fremont, CA (US); Gregory Austin Allison, Napa, CA (US); David J. Willbrand, Chagrin Falls, OH (US); Thomas McQuone Mulholland, Emsworth, PA (US)

(73) Assignee: Pacaso Inc., Cincinnati, OH (US)

( * ) Notice: Subject to any disclaimer, the term of this patent is extended or adjusted under 35 U.S.C. 154(b) by 0 days.

(21) Appl. No.: 18/456,224

(22) Filed: Aug. 25, 2023

(65) Prior Publication Data

US 2024/0111788 A1 Apr. 4, 2024

Related U.S. Application Data

(60) Provisional application No. 63/377,809, filed on Sep. 30, 2022.

(51) Int. Cl.
*G06F 16/00* (2019.01)
*G06F 16/27* (2019.01)
*G06F 16/28* (2019.01)

(52) U.S. Cl.
CPC ......... *G06F 16/275* (2019.01); *G06F 16/288* (2019.01)

(58) Field of Classification Search
None
See application file for complete search history.

(56) References Cited

U.S. PATENT DOCUMENTS 7,818,190 B1   10/2010   Sutherland
9,811,785 B1   11/2017   Bion
(Continued)

FOREIGN PATENT DOCUMENTS

CN   105763851 A   7/2016
CN   106507285 A   3/2017
(Continued)

OTHER PUBLICATIONS

Fatemeh Khazaee Fadafan, "Developing a non-compensatory approach to identify suitable zones for intensive tourism in an environment sensitive landscape," 2018, Ecological Indicators 87, pp. 152-166. (Year: 2018).

*Primary Examiner* — Jean M Corrielus
(74) *Attorney, Agent, or Firm* — Knobbe, Martens, Olson & Bear LLP

(57) ABSTRACT

An aspect relates to generation of a plurality of elements, receiving an encrypted communication of a first entity from a client requesting an element, record a transfer of the element on a distributed synchronized database to the first entity, using transferred resources to enable a first user to obtain a right in a second entity, wherein the second entity controls an object; generate a unique identifier for the first user, thereby providing enhanced anonymity and security, recording on the distributed synchronized database a certificate corresponding to the first user right, recording rules related to a transaction related to the first object, determining whether a rule is to be executed using an off-chain computer resource using a decentralized network comprising a plurality of independent nodes wherein none of the nodes has access to all of the data to be used in executing the rule thereby enhancing data security.

21 Claims, 14 Drawing Sheets

(56) References Cited

U.S. PATENT DOCUMENTS

| | | | |
|---|---|---|---|
| 10,084,600 B1 * | 9/2018 | Irwan | H04L 63/08 |
| 10,095,888 B1 * | 10/2018 | Lee | G06Q 40/03 |
| 10,476,847 B1 * | 11/2019 | Smith | H04L 63/102 |
| 10,826,682 B2 * | 11/2020 | Subramaniam | H04L 9/3239 |
| 11,025,626 B1 * | 6/2021 | Todd | H04L 9/3239 |
| 11,606,188 B1 * | 3/2023 | Lupowitz | H04L 9/00 |
| 2008/0059252 A1 | 3/2008 | Boyer | |
| 2008/0249828 A1 | 10/2008 | Vicino | |
| 2014/0358943 A1 | 12/2014 | Raymond | |
| 2019/0034837 A1 | 1/2019 | Lou | |
| 2019/0213228 A1 | 7/2019 | Charkov | |
| 2019/0332691 A1 * | 10/2019 | Beadles | G06Q 20/3829 |
| 2020/0076574 A1 * | 3/2020 | Austin | H04L 9/0637 |
| 2020/0167631 A1 | 5/2020 | Rezgui | |
| 2020/0226268 A1 * | 7/2020 | Zlotnick | H04L 9/0637 |
| 2020/0250176 A1 * | 8/2020 | Padmanabhan | H04L 9/3239 |
| 2020/0311812 A1 * | 10/2020 | Kim | G06F 16/953 |
| 2021/0125207 A1 | 4/2021 | Banerjee | |
| 2021/0182423 A1 * | 6/2021 | Padmanabhan | H04L 9/3271 |
| 2022/0116736 A1 | 4/2022 | Williams | |
| 2023/0246803 A1 * | 8/2023 | Lupowitz | G06Q 20/36 |

FOREIGN PATENT DOCUMENTS

| | | | | |
|---|---|---|---|---|
| KR | 20190110421 A | * | 9/2019 | G06Q 20/065 |
| KR | 20200056958 A | * | 5/2020 | G06Q 20/065 |
| KR | 20200056959 A | * | 5/2020 | G06Q 30/0277 |
| WO | WO-2019182310 A1 | * | 9/2019 | G06Q 20/06 |

* cited by examiner

| Block Attributes | Example values | Notes |
|---|---|---|
| House number | 3135 | |
| Street 1 | W Lake Blvd. | |
| Street 2 | | |
| Property Meta Data | | |
| City | Homewood | |
| County | Washoe | |
| State | CA | |
| Zip | 96141 | |
| Parcel number | 85;280-16000 | |
| Pacaso Market | Lake Tahoe | |
| Area (Square footage/meter) | 2484 | |
| Beds | 3 | |
| Baths | 4 | |
| Swimming pool | No | |
| Backyard/Landscaping | Yes | |
| Architecture style | Cabin | |
| Appraisal document | | pointer to the document on blockchain |
| Inspection reports | | pointer to the document on blockchain |
| Disclosure documents | | pointer to the document on blockchain |
| Photos | | pointer to the photos on blockchain |
| Token / Pacaso share info | | |
| Property id | idXYZ | |
| Property Registration Entity | Property_Registrar_123 | Property Registration service provider who issues the ID is listed in the next field |
| Property Title info | The Lakeside LLC 3135 | |
| Property Manager | Pacaso Inc. | Company managing the property and responsible for reviewing/approving sales (Pacaso in most cases) |
| Link to property | https://... com/listings/3135-w-lake-blvd- homewood-ca-96141/a-a8b- 47a9-6b58-baec-c7ecce9 | |
| Ownership Percentage | 12.5 | |
| Share ID | XYZ-12345 | |

FIG. 3

| Owner and Transaction Info | | |
|---|---|---|
| Owner ID | ABC-345987 | Identity service provider who issued the ID is listed in the next field |
| Identity Service Provider | XYZ | |
| Purchase Price | 525000 | |
| Purchase Currency | USD | |
| Purchase Date UTC | 2020/11/23 11:11 PM | |

| Loan Info | |
|---|---|
| Loan Amount | 249000 |
| Loan Currency | USD |
| Lender | Pacaso Financing |
| Loan interest rate | 4 |
| Loan term (pay off date) | |
| Loan Type (10/1 ARM etc.) | 10/1 ARM, Interest Only |

Pacaso

- USER MANAGEMENT
- MANAGE PROPERTY
- UTILITY

EXPLORE  CREATE

Properties

| Sr. | Pacaso Name | Property Manager | City | Actions | |
|---|---|---|---|---|---|
| 1 | Lilliana | David | Palm Springs, CA | Tokens | ✏️ 🗑️ |
| 2 | Arterra | Steve | Napa - Sonoma, CA | Tokens | ✏️ 🗑️ |
| 3 | Uinta | William | Park City, UT | Tokens | ✏️ 🗑️ |
| 4 | The Palm | Alex | Napa - Sonoma, CA | Tokens | ✏️ 🗑️ |
| 5 | Escondido | Manager | Malibu, CA | Tokens | ✏️ 🗑️ |
| 6 | Aquamarine | David | Malibu, CA | Tokens | ✏️ 🗑️ |
| 7 | Northwoods | Akshatshan | Breckenridge, CO | Tokens | ✏️ 🗑️ |
| 8 | Casa Estrada | Jeremy | Miami, FL | Tokens | ✏️ 🗑️ |
| 9 | Versant | James | Vail, CO | Tokens | ✏️ 🗑️ |

FIG. 5H

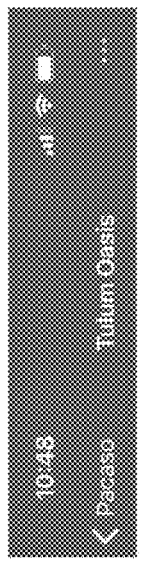
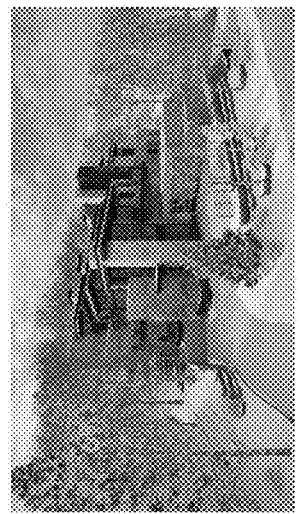
FIG. 5I

FAULT TOLERANT STORAGE OF DATA

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

Copyright Notice

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to storing data using a fault tolerant distributed storage architecture.

Description of the Related Art

Certain data records are critical for certain types of transactions. However, such records are conventionally at risk of being corrupted or unavailable (e.g., due to device failure, hacking, power loss, or otherwise).

The risk to such critical data records inhibits the use of such data records for high value, critical applications. Further, the risk of data corruption and hacking makes such data records potentially untrustworthy.

Thus, it would be advantageous to ensure the secure, reliable data storage of critical data records.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a fault tolerant data storage management system configured to utilize a distributed synchronized database, the system comprising: a network interface; at least one processing device operable to: generate a plurality of altcoins; receive over a network, using the network interface, an encrypted communication of a first entity from a client hosted on a system requesting a altcoin; record a transfer of the altcoin on a distributed synchronized database to the first entity; cause a transfer of resources from the first entity to be electronically recorded; use the resources to enable a first user to obtain a right in a second entity, wherein the second entity possesses a first object; generate a unique identifier for the first user, thereby providing enhanced anonymity and security; record on the distributed synchronized database a certificate corresponding to the first user right in the second entity, the certificate comprising the unique identifier for the first user; record a set of rules related to at least one transaction related to the first object; determine whether at least one rule is to be executed using an off-chain computer resource using a decentralized network comprising a plurality of independent nodes; at least partly in response to determining that a first rule is to be executed using an off-chain computer resource using the decentralized network comprising the plurality of independent nodes, cause the decentralized network comprising the plurality of independent nodes to access over an encrypted channel data to be used in executing the first rule, and causing the decentralized network comprising the plurality of independent nodes to execute the first rule using the data to be used in executing the first rule wherein none of the nodes has access to all of the data to be used in executing the first rule thereby enhancing data security.

An aspect of the present disclosure relates to a fault tolerant data storage management system configured to utilize a distributed synchronized database, the system comprising: a network interface; at least one processing device operable to: generate a plurality of elements; receive over a network, using the network interface, an encrypted communication of a first entity from a client hosted on a system requesting a element; record a transfer of the element on a distributed synchronized database to the first entity; cause a transfer of resources from the first entity to be electronically recorded; use the resources to enable a first user to obtain a right in a second entity, wherein the second entity possesses a first object; generate a unique identifier for the first user, thereby providing enhanced anonymity and security; record on the distributed synchronized database a certificate corresponding to the first user right in the second entity, the certificate comprising the unique identifier for the first user; record a set of rules related to at least one transaction related to the first object; cause the set of rules to be executed, wherein the set of rules cause a first action to be taken if at least a first condition or set of conditions is met.

An aspect of the present disclosure relates to a computer implemented method, the method comprising: receiving over a network, using a network interface, an encrypted communication of a first entity from a client hosted on a system requesting a altcoin; recording a transfer of the altcoin on a distributed synchronized database to the first entity; causing a transfer of resources from the first entity to be electronically recorded; using the resources to enable a first user to obtain a right in a second entity, wherein the second entity controls a first object; generating a unique identifier for the first user, thereby providing enhanced anonymity and security; recording on the distributed synchronized database a certificate corresponding to the first user right in the second entity, the certificate comprising the unique identifier for the first user; record a set of rules related to at least one transaction related to the first object; determining whether at least one rule is to be executed using an off-chain computer resource using a decentralized network comprising a plurality of independent nodes; at least partly in response to determining that a first rule is to be executed using an off-chain computer resource using the decentralized network comprising the plurality of independent nodes, causing the decentralized network comprising the plurality of independent nodes to access over an encrypted channel data to be used in executing the first rule, and causing the decentralized network comprising the plurality of independent nodes to execute the first rule using the data to be used in executing the first rule.

An aspect of the present disclosure relates to non-transitory computer readable memory having program instructions stored thereon that when executed by a computer system comprising a computing device cause the computer system to perform operations comprising: generate a plurality of altcoins; receive a communication, over an encrypted channel, of a first entity from a client hosted on a system requesting a altcoin; record a transfer of the altcoin on a distributed synchronized database to the first entity; cause a transfer of resources from the first entity to be electronically recorded; use the resources to enable a first user to obtain a right in a second entity, wherein the second entity possesses a first object; generate a unique identifier for the first user, thereby providing enhanced anonymity and security; record on the distributed synchronized database a certificate corresponding to the first user right in the second entity; record a set of rules related to at least one transaction related to the first object; execute the set of rules using data obtained from an off-chain source, wherein if the set of rules is satisfied, a first action is performed.

An aspect relates to generation of a plurality of elements, receiving an encrypted communication of a first entity from a client requesting an element, record a transfer of the element on a distributed synchronized database to the first entity, using transferred resources to enable a first user to obtain a right in a second entity, wherein the second entity controls an object; generate a unique identifier for the first user, thereby providing enhanced anonymity and security, recording on the distributed synchronized database a certificate corresponding to the first user right, recording rules related to a transaction related to the first object, determining whether a rule is to be executed using an off-chain computer resource using a decentralized network comprising a plurality of independent nodes wherein none of the nodes has access to all of the data to be used in executing the rule thereby enhancing data security.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

FIGS. 3 and 4 illustrate an example data schema.

FIGS. 5A-5I illustrate example user interfaces

DETAILED DESCRIPTION

Figure 1A:
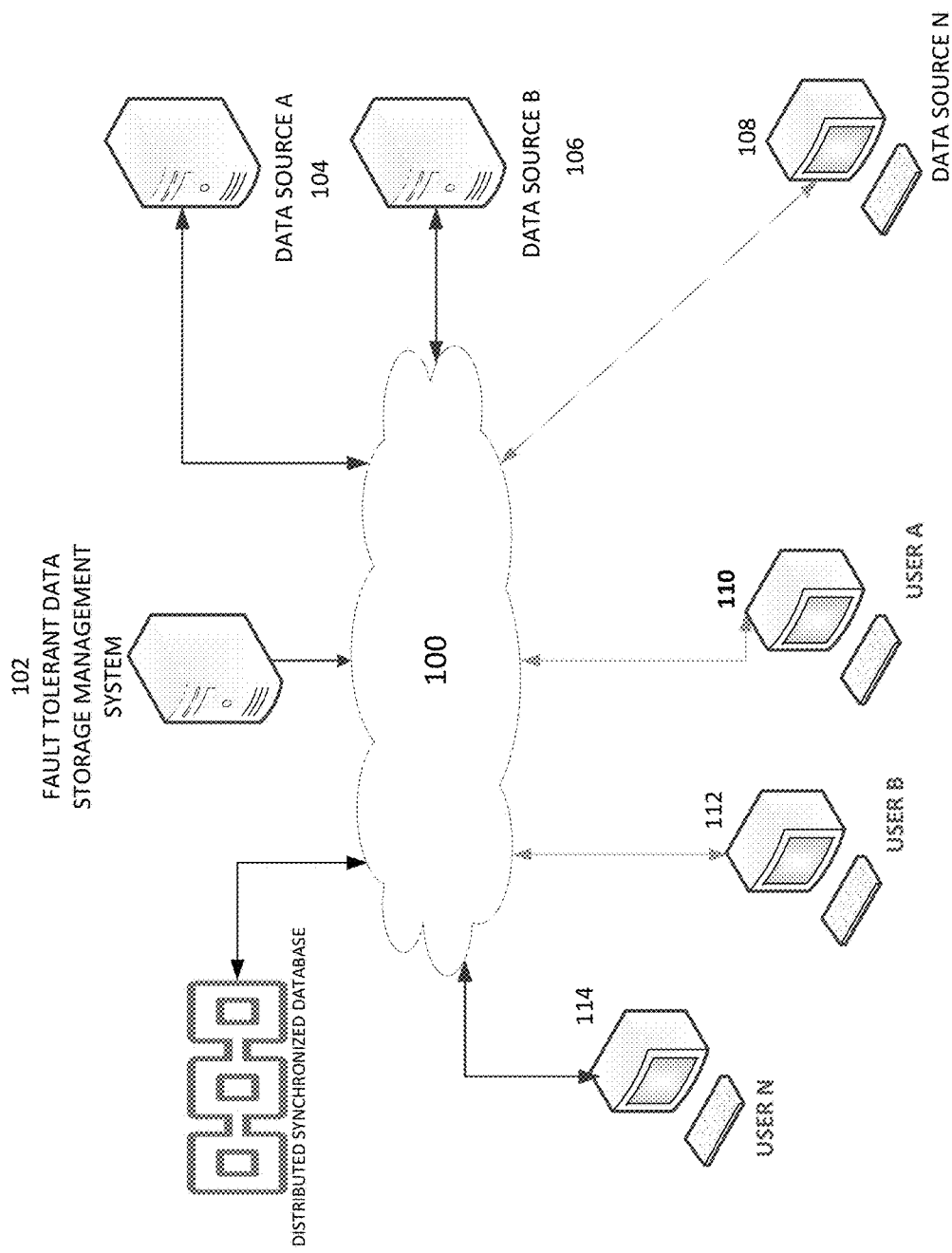
FIG. 1A illustrates an example operating environment.

An aspect of the present disclosure relates to systems and methods for ensuring the secure, verifiable, storage of data records on a distributed synchronized database.

Such a distributed synchronized database may be in the form of a distributed general ledger such as a blockchain. For example, a blockchain may comprise a list of records, which may be referred to as blocks, which are linked and secured using cryptography, which a given block may be stored on one or more blockchain nodes (e.g., a computer device, such as a server).

By way of illustration, transactions in a blockchain network are grouped into blocks that are linked together to form a chain of blocks. A block is a container including transaction details. A block may include primary attribute fields, such as a previous hash (the value of the hash of the previous block, which acts as a pointer to the previous block and is used to link blocks), data (the aggregated set of transactions that were mined and validated and included in the block), a nonce (a random value used to vary the output of the hash value), and a hash (the value obtained by passing the previous hash value, the data and the nonce through the SHA-256 algorithm which acts is the digital signature of the block). SHA-256 is a cryptographic hash algorithm that produces a unique 256-bit alphanumeric hash value for a given input.

Blockchain transactions may be stored in chronological order marked by timestamps and hash functions. Records stored in the blockchain network are permanent and immutable, where a record or transaction added to the blockchain cannot be modified or altered, so that transactions are protected from hacking. The crypto mining process may include operations configured to solve complex cryptographic hash puzzles to verify blocks of transactions that are updated on a synchronized distributed database (e.g., a decentralized blockchain ledger).

Advantageously, storing data described herein on a distributed synchronized database provides fault tolerance wherein a single point of failure will not prevent the access of data given the decentralized architecture and the techniques of achieving consensus. In addition, fault-tolerant servers may be utilized to further ensure continuous access to data.

Optionally, further security safeguards may be utilized to further enhance security and to better inhibit exploits that might breach the security of documents (e.g., share ownership certificates, titles, and/or the like), such as rug pulls, phishing attacks, routing attacks, sybil attacks (where a hacker creates a large number of fake network identities to flood and crash the system), 51% attacks (where if a miner or set of miners attains more than 50% of a blockchain network's mining those miners can control and manipulate the blockchain), routing attacks (where hackers intercept data as the data is transferred to internet service providers), cryptojacking, and/or the like. For example, in order to avoid an improper entity accessing certain user interface and data, a whitelist/allow list may be generated wherein a person needs to be on the list in order to access certain computer resources (e.g., certain user interfaces, data, documents, and/or the like). By way of further example, hardware wallets may be utilized to store and/or access certain assets (e.g., certificates, electronic keys, etc.) described herein. By way of yet further example, a virtual private network may be used in performing inter-computer communication.

Thus, the synchronized distributed database may be configured to inhibit modification of data records and to ensure such records are accessible. As described herein, the synchronized distributed database may optionally be configured as an open, distributed ledger that can record transactions between entities in a verifiable and permanent way. The synchronized distributed database may enable the decentralized aggregation, ordering, timestamping and archiving of data, such as the real estate-related information discussed herein.

The distributed synchronized database may be utilized with respect to co-owned physical real estate properties (or other object), where a given property may be co-owned by multiple people. For example, an item of real estate property may be owned by a corporate entity, such as a limited liability company, where multiple people have a partial ownership share in the corporate entity, thereby providing fractional ownership interests. By way of illustration, there may be a certain number of shares (e.g., 2, 4, 8, 10, 12, or other number of shares) in the corporate entity, where different co-owners may each have the same number of shares or a different number of shares (where different shareholders use the property at non-overlapping time periods). The real estate property may be a vacation home, where each shareholder is entitled to utilize the real estate property in a time displaced manner. Optionally, the number of shares a user has controls the amount of time the user may be permitted to use the vacation home over a given period of time.

It is understood that while certain aspects disclosed herein are discussed with respect to fractionalized ownership of physical resources such as real estate property or other objects, certain systems and processes described herein may be applied to non-fractionalized ownership of physical resources.

Optionally, rather than purchasing a share in a physical resource, users may be enabled to lease the equivalent share(s). The lease may be in the form of a lease-to-buy program, where at the end of the lease (e.g., a 1 year lease, a 2 year lease, a 5 year lease, or other lease length), or earlier, the user may purchase the share(s). Optionally, the user may be enabled to apply some or all of the lease amount previously paid to the share purchase price. The share purchase price may be the same as the share purchase price at the time the user entered into a lease or the share purchase price may be adjusted to reflect the current fair market value of the share or house (e.g., to reflect the increase or decrease since the lease was entered into).

A share purchase or lease may be recorded as a digital certificate (e.g., a document or token, such as a fungible, semi-fungible, or non-fungible token, which may act as an electronic title) on the disturbed, synchronized database network, providing advantages described herein. The digital certificate may include a unique property identifier, a unique transaction identifier (e.g., corresponding to the purchase transaction of shares in the property), a unique share identifier, a unique share owner identifier, other data described herein, and/or the like. Thus, a given share certificate has a unique digital identity, enhancing traceability of share ownership transfers from the original owner to the current owner, thereby increasing trust and avoiding clouds on the share ownership. To further enhance privacy, rather than using a shareholder name, email address, phone number, or the like to identify the share owner, the system may issue a unique, verifiable, optionally revocable credential which may be in the form of a computer generated unique alphanumeric identifier, thereby providing enhanced anonymity and security.

A contract, which may be referred to as a smart contract, may be used with respect to tokenized real estate property and/or tokenized shares in an entity that owns the real estate property. The smart contract (including rules and conditions) may be immutably recorded on the distributed synchronized database and may be configured to perform (using data-driven logic) self-executing actions when specified conditions are satisfied. The smart contract may digitize the contract rules and conditions and mimic the rules and conditions in the protocol software that governs the immutable, decentralized, distributed synchronized database. Those rules may be executed, and based on the satisfaction or failure thereof, one or more actions may be taken.

The smart contract may optionally store cryptoassets and act as an automated custodian, with specified criteria on how, when, and/or to whom the cryptoassets can be released. Optionally, the smart contracts may interact with each other and may provide composability so that a given smart contract may be built using components of another smart contract.

Where off-chain, real world data is needed by the smart contract rules to determine if certain conditions are met, an ingesting protocol converter module may be utilized to provide a secure, encrypted channel of communication between real-world data and the blockchain. The ingesting protocol converter may perform protocol translation services. For example, if the smart contract requests off-chain data (e.g., from a government property title database, from an insurance database, and/or the like), the ingesting protocol converter may translate the request into another query language compatible with the data store that stores the requested data. Once the requested data is retrieved from the data source, the ingesting protocol converter may translate the retrieved data into a format that the smart contract can read and process. Thus, the ingesting protocol converter advantageously solves the technical problem of accessing off-chain data needed by an on-chain smart contract, where the on-chain smart contract request is not compatible with the query processing abilities of the data store, and where the off-chain data is in a format that is incompatible with the smart contract.

An export protocol converter module may be provided to process data requests (e.g., for certificate data) from off-chain, legacy platforms (e.g., credit services, lenders, insurance companies, government entities, etc.) into a form that is blockchain compatible, and may then convert the requested data into a format ingestible by the requesting, off-chain platform.

An off-chain computation module may be provided to enable certain smart contract computations to be performed by off-chain computer systems, thereby providing more powerful computation resources that enable certain computations to be performed faster, with greater scalability, and more efficiently as compared to performing all computations on chain. In addition, off-chain computation may better ensure that private data, such as user identity-related data, is not recorded on a public blockchain ledger for public viewing.

Optionally, the off-chain module may determine whether a given computation is to be performed on chain or off-chain The determination may be based on one or multiple criteria, such as a prediction as to whether the computation will be performed faster on-chain or off-chain or where privacy is desired.

Optionally, to ensure that off-chain data and/or computation resources are accessed in a secure, tamper-resistant manner, decentralized oracle networks (DONs) may be utilized. A decentralized oracle network may eliminate any single point of failure in a smart contract by utilizing multiple data inputs. The decentralized oracle network nodes may communicate with each other over an encrypted network channel (e.g., using one or more encryption techniques described herein). For example, a decentralized oracle network may include a set of independent blockchain oracles that provide, over an encrypted network channel, data to a blockchain, where each independent node or oracle in the decentralized oracle network independently retrieves data from an off-chain source and brings it on-chain.

Optionally, verifiable off-chain computation may be utilized where a prover executes a computation off-chain and then publishes the result including a cryptographic proof attesting the computation's correctness to the blockchain. An on-chain verifier then verifies the proof and persists the result in case of success.

Optionally, to further enhance security, a secure multi-party protocol may be utilized to preserve privacy when performing off-chain computations. For example, using a secure multiparty protocol computation, a set of nodes (optionally configured as decentralized oracle networks) may be utilized to compute functions corresponding to a rule on secret data where none of the nodes has access to the data in its entirety to thereby enhance data security and privacy. Thus, the system may cause one or more smart contract rules to be executed using secret data (or other data) accessed over an encrypted network channel by a set independent decentralized nodes where none of the nodes has access to the data in its entirety.

By way of illustration, the terms of the agreement (e.g., between a buyer and seller of shares in an entity that owns real estate property, between a lender and an owner of shares in the entity, between a lessee and an entity that owns the real estate property, etc.) may be coded into software that controls the execution of the agreement. The software code and the agreements contained therein thus exist across a distributed, decentralized, synchronized blockchain network which may impartially and securely execute the agreement. The executed transactions may be trackable and irreversible.

Thus, a smart contract (e.g., between a corporate entity that owns a real estate property, and a user that purchases a share in the corporate entity, or between an owner selling a share and a buyer buying the share) enables trusted transactions and agreements to be executed among disparate, parties without the need for a central authority. Optionally, the data (e.g., including the contract terms, related documents, a non-fungible or fungible token corresponding to an ownership share in an entity that owns real estate property, etc.), stored on the distributed, synchronized database may be transparent, enabling anyone that is part of the distributed, synchronized database network to view the data, and where data can be traced to its origin.

Optionally, the smart contract may specify benefits that are to be provided to a purchaser of a share in an item of real estate. For example, the smart contract may include rules that specify that the purchaser of a share will be provided access to access or enhanced access to cultural events, golf club memberships, discounted ski passes, and/or the like. Thus, a token corresponding to a share may function a membership card or ticket, providing access to ticketed events, rights to obtain products, discounts for products and services, and/or may function as a digital key to online content and/or services (e.g., a social networking site for share owners, where the share owners can message each other and share information and content). Optionally, rather than using the same token for a share and to provide the foregoing functionality, a separate token may be provided in conjunction with the share token that provides the foregoing functionality.

Optionally, to enhance privacy and security cryptography may be used to conceal the smart contract logic. Such a smart contract may be recorded on a privacy-enhanced blockchain as described herein.

Thus, the use of a distributed synchronized database enables trust building across multiple organizations through increased transparency for the different aspects of an asset, such as a share in an entity that owns real estate. Such aspects may include share ownership, share-related transactions, liens on the shares or underlying real estate property, mortgages on the real properties or shares thereon, and/or the like. Further, the use of a distributed synchronized database as described herein enables users to securely sell, exchange, or trade such shares or other digitized real estate property with enhanced liquidity. Yet further, the tokenization of real estate enables a shareholder to identify and obtain more advantageous financing (e.g., loans) when they are equity and income aware in a liquid lending marketplace.

By way of example, a smart contract may be configured to automatically transfer ownership of a share in an entity that owns a real estate property to a purchaser when specified conditions are met. The distributed, synchronized database network may verify that the conditions are met. By way of further example, the smart contract may be configured to verify that certain documents have been executed relating to the transfer of a share.

The distributed, synchronized database may be utilized as a share/property listing platform and/or as legal documenter.

Optionally, the distributed, synchronized database network may be a private, permissioned network, wherein an invitation needs to be issued to an entity and the entity needs to present the invitation to an access control authority system that needs to validate the invitation in order for the entity to access data stored on the private distributed synchronized database network. For example, the access control authority may be the network starter or set of rules put in place by the network starter. Thus, the private blockchain may utilize identity (which may optionally include the unique computer generated identifier described herein) to confirm membership and access privileges. Optionally, the private blockchain may only permit known entities to join. The private blockchain may use a selective endorsement process where known users verify a given transaction. Optionally, only members with the appropriate access and permissions are permitted to maintain the transaction ledger.

An aspect of the present disclosure relates to generating and using a digital, crypto token or coin (which may be collectively referred to as a token, altcoin, or element) configured to be used with respect to real estate-related transactions, such as the funding of loans, purchases, sales and/or the like. The term "coin" generally refers to a cryptocurrency that is native to its own blockchain, while the term token is generally built on an existing blockchain. It is understood that although certain examples may refer to a coin, a token may be used instead. Likewise, although certain examples may refer to a token, a coin may be used instead. The token or coin may be non-fungible or fungible. By way of example, funds collected through sale of such a crypto-coins (e.g., in exchange for a resource, such as another token-type, fiat currency, or other item) may be utilized to provide financing to purchasers of shares in entities that own properties, such as vacation homes (e.g., where ownership of a share entitles the user to utilize the vacation home for designated amounts of time in a time displaced manner). The transfer of funds received from a given coin acquirer may be electronically recorded in persistent memory, such as a financial institution database in an account record.

For example, a coin may be minted configured to be used in conjunction with its own corresponding blockchain. By way of further example a coin may be configured as a stablecoin backed/collateralized by a pool of government issued currency, real estate property, and/or outstanding loans for real estate property or shares in an entity that owns real estate property.

Thus, because the value of the stablecoin is pegged or tied to a pool of government issued currency, real estate property, and/or outstanding loans for real estate property or shares in an entity that owns real estate property, the stablecoin will be less volatile than conventional cryptocurrencies. This stability fosters blockchain transactions and smart contracts by enhancing the confidence in the stablecoin by mitigating risks to buyers and sellers. Optionally, the stablecoin may be over-collateralized (e.g., where the value of the collateral exceeds that of the stablecoin) thereby ensuring that the stablecoin value remains fairly stable even if the value of the collateral decreases by a certain amount. Optionally, a liquidation demand threshold may be specified, wherein once the liquidation demand threshold is reached, the issuance of new loans may be paused until the liquidation demand fails below a second threshold.

An advantage of collateralizing the stablecoin with loans (such as those provided to fund the acquisition of shares in an entity that owns a property, thereby providing fractionalized ownership) or real property, rather than gold or other such physical asset, is that such loans do not require storage space or physical security, as is the case with gold or the like. Further, stablecoins may be tradable across many crypto-exchanges.

By way of illustration, stablecoins collateralized by real estate or shares that provide fractionalized ownership (which will be referred to as property-backed coins) may be purchased by an investor using fiat currency (a government-issued currency that is not backed by a commodity such as gold) at the current property-backed coin value. Optionally, after the initial sale (e.g., in a primary offering in exchange for a resource, such as fiat currency or a token), the property-backed coin may be enabled to be traded (e.g., sold) on secondary markets, thereby providing liquidity and flexibility.

Optionally, the coin value may be calculated using the total outstanding loans on the shares or on the underlying real estate and/or on a pool of fiat funds. Optionally, the pool of fiat funds may include funds not yet deployed as loans (financing, such as single family rental financing, provided to an entity to purchase an item of real property who ownership is to be fractionalized), interest on the pool (in fiat currency) that is collected in the pool, related fees (e.g., origination fees when a new loan is issued), transaction fees associated with the conversion of a property-backed coin to fiat currency, fees paid by vendors for offering their services to owners of a shares in an entity that owns a property (such as a vacation property), and/or the like. Optionally, a minimum fiat amount may be maintained in the pool for a given time period (e.g., annually).

Optionally, as discussed above, the funds raised by the sale of the stablecoins or other element may be used to provide financing (e.g., loans) to buyers of a fractionalized interest in an item of real estate proper (e.g., a buyer of shares in an entity that owns the property). Optionally, the interest charged to the seller for such financing may be at a market determined rate, although the rate may be set higher or lower than market determined interest rates (e.g., if there is relatively higher liquidity, the interest rate may be set lower than the market determined interest rates, and if there is relatively lower liquidity, the interest rate may be set higher than the market determined interest rates). Optionally, the rates may be dynamically adjusted and may or may not be capped.

The financing may be arranged and serviced by a mortgage entity associated with an entity that sets up entities that purchase a property (optionally a single property) in which shares are to be sold.

Advantageously, by using the sales of property-backed coins, the mortgage entity does not have to actively distribute interest to the investors. The property-backed coins are stable because they are secured by an underlying real estate portfolio.

Optionally, the property-backed coins may be utilized to pay for maintenance expenses associated with the real estate property, for purchasing shares in a property, for concierge services, and/or other purposes.

Optionally, in addition to or instead of utilizing stablecoins for the purposes discussed above, a Decentralized Autonomous Organization (DAO) may be utilized with tokens. Advantageously, the DAO may be automated and decentralized, may act as a venture capital fund, may be based on open-source code and optionally without a management structure. Further, the DAO enables investors to anonymously invest funds. Advantageously, the automated DAO may reduce human error or misuse of investor funds as the automated DAO has decision-making power and a crowdsourced process. Optionally, owners of tokens may be provided with certain project voting rights.

Optionally, to enhance liquidity, daily currency rates and index rates (e.g., from the Consumer Price Index and Personal Consumption Expenditures) may be monitored.

Optionally, with respect to transaction fees (e.g., related to loans to purchase shares, loans to purchase property, fees paid by vendors to promote their goods and services to shareholders, fees associated with converting stablecoins to fiat currencies, and/or the like) may be split amongst multiple entities, such as entities disclosed herein. Optionally, a portion of the transaction may be placed in a liquidity reserve, Against which stablecoin holdings can be redeemed, to improve the liquidity.

Advantageously, because, optionally, users who want to redeem or sell their stablecoins for fiat currency are able to do so at the current stablecoin face value (optionally minus a transaction fee), there will be little or no incentive for sellers to sell their stablecoins on secondary markets at a discounted rate thereby reducing volatility in the value of the stablecoin.

Optionally, if a new blockchain is being configured for use with the above described coin, a consensus mechanism may be defined, such as how transactions are to be verified and how blocks are to be added to the network to enhance security. For example, a proof-of-work (PoW) or proof-of-stake (PoS) consensus mechanism may be utilized. Advantageously, a proof-of-stake consensus mechanism may be utilized as it may be more energy-efficient than a proof-of-work consensus mechanism. The blockchain may optionally be configured as a public, private, or permissioned.

Optionally, the tokens associated with an entity that owns a given item of real estate may be generated as fixed supply tokens, where all the tokens are generated at about the same time (e.g., via a smart contract) or additional tokens may be generated for the initial sale of each share in the entity.

As discussed elsewhere herein, a given real estate-related transaction may be recorded on a distributed, synchronized database. The transaction may be signed by one or more of the real estate-related transaction participants. In order to enhance security and reliability, the real estate-related transaction may be replicated to multiple nodes. When a miner attempts to add a new block of real estate-related or other transactions to the distributed, synchronized database, the block may be broadcast to other nodes on the network that may need to synchronize with the distributed, synchronized database. Nodes may accept the block or reject the block based on as determination as to the block legitimacy (e.g., the validity of signature and transactions). If a node accepts a new block of transactions, the node stores the block of transactions to maintain the distributed, synchronized database transaction history.

Thus, data within a given real estate transaction may be stored identically yet independently by each node in the network, in conjunction with a proof of who wrote the transaction and when the transaction was written to the network node. The recorded transaction may later be retrieved.

The disclosed distributed synchronized database advantageously provides banking and other financial institutions a single version of verified information, secure data sharing, immutable transaction monitoring, and/or real-time payment settlement. A tokenized residential real estate (NFT) marketplace, offering global liquidity, innovative financing models (peer-to-peer lending, asset backed derivatives. crowdfunding, home equity line of credit, etc.) with respect to financing a purchase of a share in an entity that owns real estate (e.g., a vacation home) and enabling efficient transactions.

Certain additional advantages of tokenized property and shares will now be discussed. As discussed elsewhere herein, a token may be a digital representation of a real-world asset, such as a share in real estate, which may be referred to as a tokenized share. For example, peer-to-peer technology may be provided or accessed that enables people or other entities to lend or borrow money (e.g., to loan money to a person to purchase shares in an entity that owns an item of real estate property) from one another without going through a bank. By way of further example, real estate property derivatives are instruments that enable investors to gain financial exposure to the real estate asset class without having to actually own the real estate. Instead, rather than actually owning real property, the performance of a real estate return index may be utilized and/or the inventor may purchase a token corresponding to a share in an entity that owns an item of real estate (e.g., a vacation home).

By way of example, an inventor may purchase a coin, such as a stablecoin, paying the current value of the coin. Optionally, after the primary offering the coins may be traded on secondary markets, thereby providing investor liquidity and flexibility. A coin value may depend one or more of the following factors: total outstanding loans on the real estate, the amount of fiat funds in a pool backing the coins (e.g., including one or more of funds not yet deployed as loans (e.g., financing to be used to purchase single family residences), interest (e.g., in fiat currency) that is collected in the pool, and/or collected fees (e.g., origination fees associated with the issuance of new loans, transaction fees associated with converting a coin to fiat currency, and/or fees paid by vendors for offering (e.g., on an online marketplace) their goods and services to owners of shares in an entity that owns an item of real estate).

A tokenized share or a coin may be securely transferred from one entity, such as a person, and a second entity, such as a second person. The transfer may be recorded on the secure, tamper-proof, distributed synchronized database distributed across a network of computers, which verify the transaction. The status of the transaction may be viewed by the parties involved in the transaction, including the transferor, the transferee, and other involved parties, such lenders or lienholders. The history of transactions involving the tokenized share may thus be available.

Optionally, the disclosed system may enable resource-discovery use-cases for smart home tokens with respect to the needs of the owners of an item of real estate, such as for maintenance services, rental yield management, short-term rentals for homeowners, boat rentals, ski passes and/or the like. The system may address satisfaction of such needs as optimization problems with tokens that can interoperably identify more satisfactory resources to add value or reduce costs in the automated management of the real estate asset's yield. The system may utilize resource matching patterns to identify vendors and/or lenders that are the most suitable for a given need, providing enhanced results for share owners and for vendors and lenders.

Optionally, machine learning, such as a neural network, may be utilized to match users with providers and provider services or products. For example, with respect to financing of a share purchase, a neural network may be configured to classify a potential loan as likely non-default (that the loan will be repaid) or likely default (that the loan will not be repaid). In addition, a learning engine, such as a neural network, may be utilized to predict a rate of return. The classification and predicted rate of return may be utilized to generate a score and/or recommendation with respect to the suitability of a given share for a given loan. The learning engine may utilize some or all of the following data in performing a classification: borrower characteristics (e.g., annual income, liquid and non-liquid assets, and/or the like), borrower assessment (e.g., amount of outstanding loans, loan payment history, credit score, and/or the like), and/or the current value of the underlying real estate property corresponding to the share. The learning engine may be a convolutional neural network and may comprise an input layer, one or more hidden layers, a pooling layer, and an output layer. The learning engine may be trained using inputs from loans actually granted and a determination may be made as to whether the predicted result (e.g., default, non-default) matches the actual result. The neural network layer node weights may be adjusted using backpropagation based on an error function output with respect to the correctness of the classifications by the neural network.

Such resource matching will advantageously reduce the need to advertise goods and services, thereby reducing the utilization of computer and network resources that would otherwise be incurred by such advertising.

A multilayered architecture may be utilized in conjunction with the services described herein. For example, the multilayered architecture may include one or more of the following layers:

Layer 1: A settlement layer that includes a blockchain and its native protocol asset (e.g., the stablecoin described herein). The settlement layer enables ownership information to be securely on the blockchain network and ensures that state changes adhere to the network's ruleset.

Layer 2: an asset layer consists of assets (e.g., native protocol coins and tokens, virtual versions of stocks and shares, and/or the like) that are issued on top of the settlement layer.

Layer 3: a protocol layer provides standards for specific use cases such as decentralized exchanges, debt markets, derivatives, and on-chain asset management. These standards are optionally implemented using a set of one or more smart contracts. For example, the standards may be accessed by a user or an application (such as an application providing peer-to-peer financing)

Layer 4: an application layer that comprises smart contracts, chaincode and decentralized, user-friendly applications. The application layer protocols may be subdivided into the application and the execution layers. The application layer may provide user-oriented applications that connect to respective protocols.

Layer 5: an aggregation layer acts as an extension of the application layer and may offer users a range of financial and may connect to multiple platforms simultaneously, such as a platform for lending and borrowing, comparing loan rates and services.

An example system architecture that may be utilized to perform services and operations described herein (e.g., data and electronic documents recording services, coin minting services, token and coin transfer services, coin-to fiat conversion services, token and coin sales services, search services, financing matching services, product and service matching services, fee distribution services, off-chain import services, off-chain export services, off-chain computer processing management services, and/or other services described herein) will now be discussed with reference to FIG. 1A. The various systems and devices may communicate with each other over one or wired and/or wireless networks 100 (e.g., the Internet, Ethernet, or other wide area or local area network). In the illustrated embodiment, a fault tolerant data storage management system 102 may be hosted on one or more servers. The fault tolerant data storage management system 102 may be cloud-based and may be accessed by one or more user computer systems 110, 112, 114 over the network 100. User computer systems 1'10, 112, 114 and provider computer systems 104, 106, 108 may be able to share software applications, computing resources, and data storage provided by the fault tolerant data storage management system 102. The fault tolerant data storage management system 102 may be configured to enable the system operator to manage and oversee rights associated with a given property (owned by a company, where users of the property own shares in the company as described elsewhere herein). The fault tolerant data storage management system 102 may map the rights of a given share to a token or a distributed, synchronized database (e.g., a blockchain).

The user computer systems 110, 112, 114 and provider computer systems 104, 106, 108 may be in the form of a desktop computer, laptop computer, tablet computer, mobile phone, smart television, dedicated server system, cloud-based system, and/or other computing system. The provider computer systems 104, 106, 108 may be associated with entities that provide various goods and services, such as those described herein (e.g., loans, real estate property maintenance service vendors, etc.).

Optionally, the system 102 may be connected to a secure, tamper-resistant manner, decentralized oracle networks to access off-chain data and/or to utilize off-chain computing.

A user computer system and a provider computer system may include user input and output devices, such as displays (touch or non-touch displays), speakers, microphones, trackpads, mice, pen input, printers, haptic feedback devices, cameras, and the like. A user system or data source computer system may include wireless and/or wired network interfaces via which the computer systems may communicate with each other or the fault tolerant data storage management system 102 over one or more networks.

User interfaces may be provided that are optionally configured to present data (optionally in real time) from sources described herein and to receive user commands, which may optionally be executed in whole or in part by the fault tolerant data storage management system 102 in real time or in batch mode. The user interfaces may enable a user to view and edit their account information, access documents (e.g., share certificates) such as those disclosed herein, view their tokens and altcoins, initiate the sale or transfer of tokens, altcoins, and other on-chain assets. The user interface may be accessed via a dedicated application (sometimes referred to as an "app") or via a browser.

In order to communicate with the fault tolerant data storage management system 102, a client (e.g., a system browser or a dedicated network resource access application hosted by a user computer system) may initiate a handshaking message to the fault tolerant data storage management system 102. The handshaking message may identify the cipher suites supported by the client and other cryptographic information (e.g., the maximum supported version of transport layer security or secure sockets layer, the client's order of preference). The handshaking message may optionally identify data compression methods supported by the user computer system. The handshaking message may include a random byte string that may be used in generating encryption keys.

The fault tolerant data storage management system 102 may respond to the client with a handshaking signal which identifies the cipher suite suit and encryption version (selected from those identified in the client handshaking message) that will be used. The fault tolerant data storage management system 102 message may also include a session ID and another random byte string. The fault tolerant data storage management system 102 may additionally transmit its digital certificate. The fault tolerant data storage management system 102 may also transmit a client certificate request that identifies the types of certificates supported and the Distinguished Names of acceptable Certification Authorities (CAs), which the client may verify.

The random byte string transmitted by the client to the fault tolerant data storage management system 102 may be utilized by both the client and the fault tolerant data storage management system 102 to generate a secret key that may be used for encrypting subsequent message data. Asymmetric encryption may be utilized to generate a shared secret key. The random byte string itself may be encrypted with the fault tolerant data storage management system 102's public key.

By way of further example, a given item of data may be encrypted using an AES-128 key or public key cryptography/asymmetric cryptography. If symmetric encryption is used, then the encryption key and the decryption key may be the same key. If public key cryptography/asymmetric cryptography is used, then a public key may be used to encrypt the data and a private key may be generated to decrypt the data. Thus, communications described herein between a user device and a remote system may be performed using the foregoing secure communication technological techniques.

Optionally, a version of the user interfaces described herein may be enhanced for use with a small touch screen (e.g., 4 to 13 inches diagonal), such as that of a mobile phone or a tablet computer. For example, the orientation of the controls may be relatively more vertical rather than horizontal to reflect the height/width ratio of a typical mobile device display. Further, the user interfaces may utilize contextual controls that are displayed in response to an inferred user desire, rather than displaying a large number of tiny controls at the same time (which would make them hard to select or manipulate using a finger).

Figure 1B:
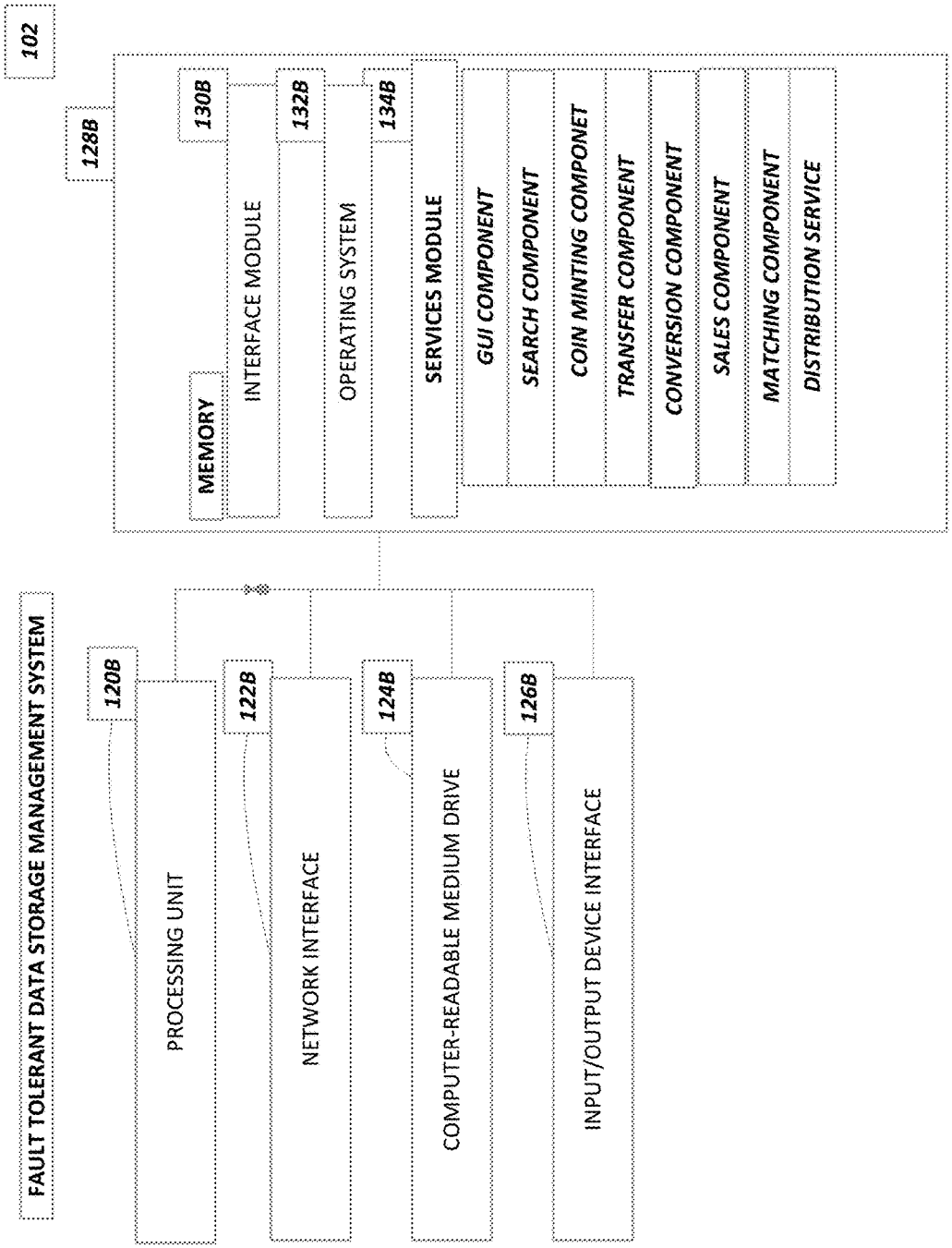
FIG. 1B illustrates an example fault tolerant data storage management system architecture.

FIG. 1B depicts a block diagram illustrating an embodiment of example components of the example fault tolerant data storage management system 102 hosting a services module 134B. The system includes an arrangement of computer hardware and software components that may be used to implement aspects of the present disclosure. Those skilled in the art will appreciate that the example components may include more (or fewer) components than those depicted in FIG. 1B.

The system hosting the services module 134B may include one or more processing units 120B (e.g., a general purpose processor and/or a high speed graphics processor with integrated transform, lighting, triangle setup/clipping, and/or rendering engines), one or more network interfaces 122B, a non-transitory computer-readable medium drive 124B, and an input/output device interface 126B, all of which may communicate with one another by way of one or more communication buses.

The network interface 122B may provide connectivity to and communications with one or more networks or computing systems (e.g., one or more of the systems illustrated in FIG. 1A). The processing unit 120B may thus communicate information and instructions to and/or from other computing devices, systems, or services via a network. The processing unit 120B may also communicate to and from memory 124B and further provide output information via the input/output device interface 126B. The input/output device interface 126B may also accept input from one or more input devices, such as a keyboard, mouse, digital pen, touch screen, microphone, camera, other sensors, etc.

The memory 128B may contain computer program instructions that the processing unit 120B may execute in order to implement one or more aspects of the present disclosure. The memory 128B generally includes RAM, ROM (and variants thereof, such as EEPROM) and/or other persistent or non-transitory computer-readable storage media. The memory 128B may store an operating system 132B that provides computer program instructions for use by the processing unit 120B in the general administration and operation of the services module 134B, including its components.

The services module 134B may include a GUI component configured to generate graphical user interfaces which may be displayed on user systems, a component configured to provide data and electronic documents recording services (e.g., to record certificates of share ownership, rights to attend certain events and activities, rights to certain discounts), a component providing or initiating coin minting services (e.g., by authenticating data, creating new blocks, and recording corresponding information onto a blockchain using an appropriate protocol), a component providing token and coin transfer services (e.g., to transfer a token or coin from one digital wallet to another), a component providing coin-to fiat conversion services, a component providing token and coin sales services, a component providing search services (e.g., enabling a user to search for properties for which shares may be purchased, that enables a user to search for a record of transfers for a given share token, etc.), a component providing financing matching services and product and service matching services (which may include learning engines configured to classify potential borrowers), fee distribution services. As similarly discussed elsewhere herein, the component providing financing matching services and service matching services may include artificial intelligence/learning engines, such as a neural network, an expert system, rules-based systems, and/or support vector machines configured to classify a particular loan as falling into a risk class and to identify services providers that are most likely to be suitable for a given real estate property-related service.

The memory 128B may store user accounts including user preferences, explicitly provided data, inferred data, demographic data, share ownership data, loan data (e.g., loan amount, monthly payment, payment due dates, type of loan, loan interest rate, and/or the like), user reservation data, user-specific special dates, user contact information, and/or other user data discussed herein. Optionally, in addition or instead, the data may be stored remotely on a cloud-based or other networked data store. The account data may optionally be stored in a relational database, an SQL database, a NOSQL database, a hierarchical database, an object oriented database, a graph database, and/or other database type.

The memory 128B may include an interface module 130B. The interface module 130B can be configured to facilitate generating one or more interfaces through which a compatible computing device may send data to, or it may receive data from the services module 134B, rules engine 136B and/or the exchange rules engine 138B.

The system 102 may be configured to generate or have generated access codes for respective properties. Optionally, a new access code may be generated for each confirmed reservation for a given property. The system 102 may be configured to transmit the access code to a given user for a property reservation within a specified period of time. The system 102 may be further configured to program property locking systems to accept specified access codes and to grant user access to a given property in response to receiving a valid access code. The access code may then be entered by the user to a property locking system to access the property during the user's reservation. The system 102 may also implement rules regarding the reservation of such a given property. Example systems and methods for reserving a physical resource are described in U.S. Pat. No. 11,281,738, filed Jun. 9, 2021, issued Mar. 22, 2022, titled "SECURE RESOURCE ALLOCATION UTILIZING A LEARNING ENGINE," the content of which is incorporated by reference in its entirety.

The modules or components described above may also include additional modules or may be implemented by computing devices that may not be depicted in FIGS. 1A and 1B. For example, although the interface module 130B and the services module 134B are identified in FIG. 1B as single modules, the modules may be implemented by two or more modules and in a distributed manner. By way of further example, the processing unit 120B may include a general purpose processor and a graphics processing unit (GPU). The system hosting the services module 134B may offload compute-intensive portions of the applications to the GPU, while other code may run on the general purpose processor. The GPU may include hundreds or thousands of core processors configured to process tasks in parallel. The GPU may include high speed memory dedicated for graphics processing tasks. As another example, the system hosting the services module 134B and its components can be implemented by network servers, application servers, cloud-base systems, database servers, combinations of the same, or the like, configured to facilitate data transmission to and from data stores, and other party systems via one or more networks. Accordingly, the depictions of the modules are illustrative in nature.

Figure 2:
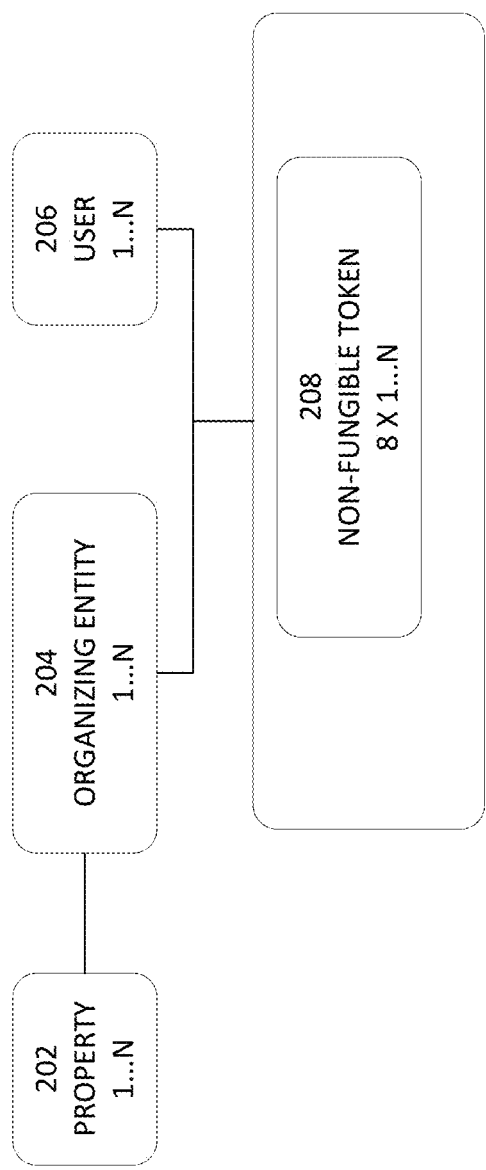
FIG. 2 illustrates an example process

Referring now to FIG. 2, an example token generation process is illustrated. There may be one or more real estate properties 202. As similarly discussed elsewhere herein, a given real estate property may be a vacation home (e.g., a single family residence). A given real estate property may be owned by a respective corporate entity 202, each property 202 (where there may be 1 to N properties) is owned by a corresponding organizing entity 204 (where there may be 1 to N organizing entities). A given organizing entity 204 may be established by the operator of a fault tolerant data storage management system, such as the fault tolerant data storage management system 102 described elsewhere herein. Shares in a given organizing entity 204 may be sold to respective users 206 (where there may be 1 to N users). For example, there may be a total of 8 shares in an organizing entity, where a user may purchase one or more shares. Ownership of a share may entitle the shareholder to user the property for a certain amount of time (e.g., where the shareholder reserves the property in accordance with reservation rules that govern the amount of time for which a shareholder may reserve the property, how many time a shareholder may reserve the property within a specified time period, exclusion dates for the reservation of the property, and/or the like). Optionally, shareholders are not assigned set periods of time to use the house, but may reserve the house for a certain number of stays in a given time period, for a certain number of days in a given time period, for a certain number of special dates (e.g., public holidays, popular vacation days, other days of expected high demand, etc.) in a given time period, where the house may be unavailable on certain days (e.g., for maintenance), etc. Example systems and methods for reserving a physical resource are described in U.S. Pat. No. 11,281,738, filed Jun. 9, 2021, issued Mar. 22, 2022, titled "SECURE RESOURCE ALLOCATION UTILIZING A LEARNING ENGINE," the content of which is incorporated by reference in its entirety. In addition, ownership of a share may entitle the user to other resources, such as access or enhanced access to cultural events, golf club memberships, discounted ski passes, and/or the like. A certificate of ownership, optionally in the form of a token 208 (e.g., a non-fungible token), may be generated for each share. The token may be recorded on a synchronized, distributed, database, such as a blockchain.

An example of the data optionally included a share certificate data schema is illustrated in FIGS. 3 and 4. It is understood that a share certificate may include less, more, or different data. The certificate may include a description of the property, including a house number, address, city, county, state, zip code, parcel number, market, area (square footage/meters), number of bedrooms, number of bathrooms, an indication as to whether or not there is a swimming pool, an indication as to whether or not there is a backyard and/or landscaping, architecture style, a pointer to an appraisal document stored on a distributed synchronized database (e.g., a blockchain), a pointer to inspection reports stored on a distributed synchronized database (e.g., a blockchain), a pointer to inspection reports stored on a distributed synchronized database (e.g., a blockchain), and/or a pointer to property photographs and/or videos stored on a distributed synchronized database (e.g., a blockchain).

In addition, in this example, the certificate may include share information with respect to an ownership share in a legal entity that owns the property. The share information may include a unique property identifier provided by a property registration service provider, a property registration service provider identifier, property title information, a property, a property manager identifier (e.g., the company managing the property and responsible for reviewing and approving sales of shares). A link to a property listing hosted by the property manager, an ownership percentage in the entity that owns the property, and/or a unique share identifier.

In this example, the certificate also includes share ownership and transaction information. The example certificate includes a unique alphanumeric owner identifier, a unique alphanumeric identifier of the entity that issued the owner identifier, a share purchase price, a purchase currency, and a purchase date and time. Where the purchase of the share is financed, loan information may be included. Such information may include a loan amount, a loan currency, a loan interest rate, a loan term (pay of date), and a loan type (e.g., an adjustable rate mortgage, a fixed rate mortgage, a jumbo loan, and/or the like).

Advantageously, the use of links in the certificate to already existing additional data and content reduces the amount of computer readable memory that would otherwise need to be used to store another copy of the data and content. Further, the use of links enables the certificate to provide access to the latest version of such off-certificate data and content.

FIGS. 5A-5I illustrate example user interfaces. The data used to populate the user interfaces may be accessed from a distributed synchronized database (e.g., a blockchain) and/or from one or more of the disclosed systems and data stores.

Figure 5A:
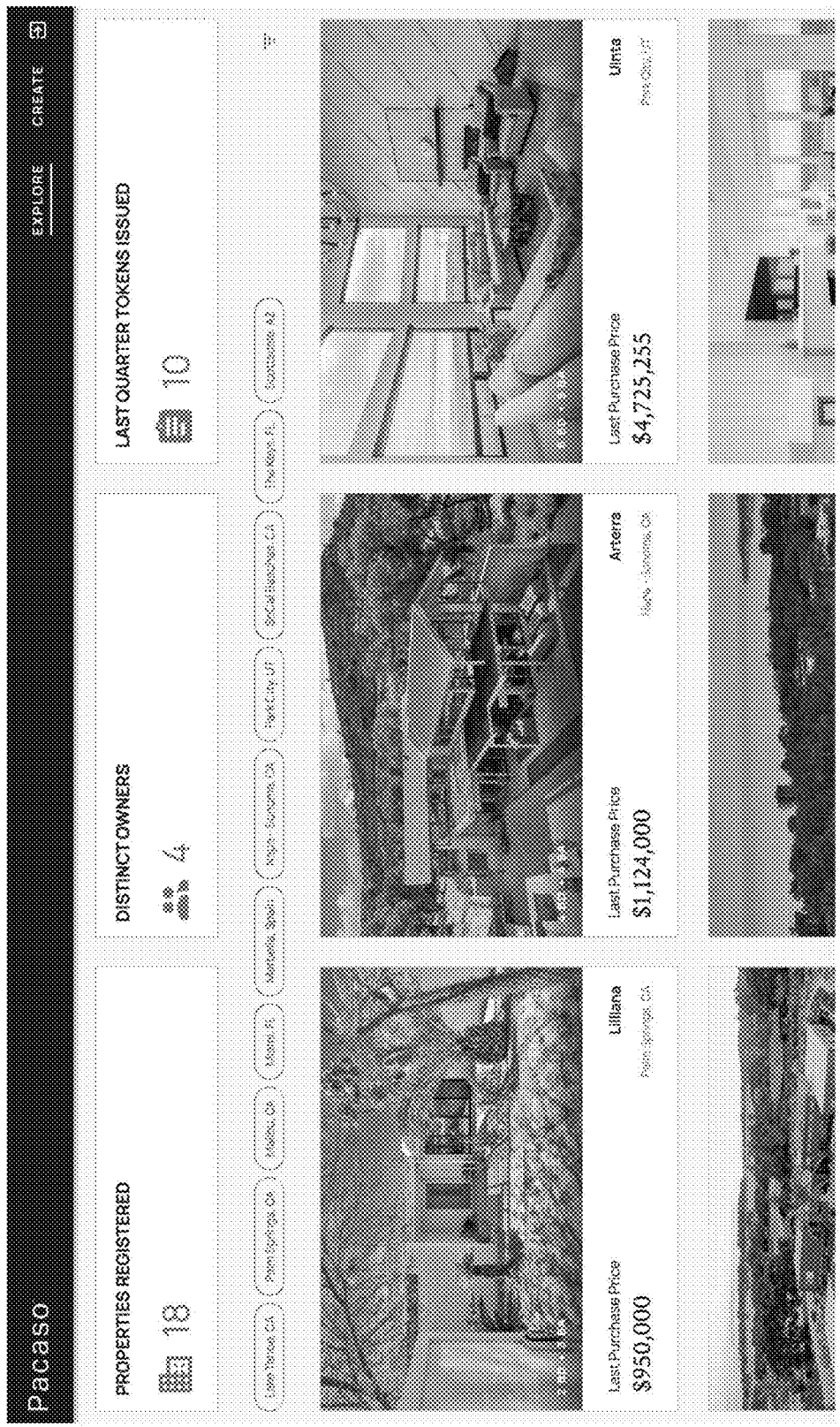

FIG. 5A illustrates an example of a tokenization dashboard providing information regarding tokenized real property. Some or all of the data used to populate the dashboard may be retrieved from the distributed synchronized database (e.g., a blockchain), thereby ensuring data integrity. The dashboard user interface may indicate how many properties have been tokenized (e.g., had tokens minted that correspond to ownership shares in an entity that owns respective real property) in a "properties registered" field. The dashboard user interface may indicate the number of distinct token owners in a "distinct owners" field. The dashboard user interface may display the number of new tokens that have been issued in a given time period, such as in the last calendar quarter, in a "last quarter tokens issued" field.

The dashboard user interface may also be populated with information regarding the tokenized properties. For example, the information may include one or more photographs of a given property, the number of bedrooms, the number of bathrooms, an identifier (e.g., a proper name and/or a code), and/or location data (e.g., city, state). Optionally, the display data may be sorted by the system so that properties may be displayed in a sorted order (e.g., from most recent to least recent tokenized properties, where the most recent tokenized properties are displayed first). Optionally, sort controls may be provided via which the user can sort the displayed properties in accordance with one or more associated items of metadata, such as price, number of bedrooms, number of bathrooms, distance from the viewing user (e.g., as determined from the user's device's IP address, profile information, manually entered location, or otherwise).

Filter controls may be provided via which the user can instruct the user interface to filter the displayed properties according to one or more criteria. Examples of filter controls may include location, price (or price range), number of bedrooms (or a range thereof), number of bathrooms (or a range thereof), square footage (or a range thereof), number of owners (or a range thereof), and/or the like.

A given property listing may be associated with a link, wherein in response to a user selecting a property (e.g., by clicking or tapping on or hovering over the property image, data, or a details link), a property details user interface may be presented providing additional property details.

Figure 5B:

FIG. 5B illustrates an example property details user interface. By way of example, the rendered property details may optionally include property attributes such as the number of bedrooms, bathrooms, and area (e.g., specified in square feet for the building structure and/or for the property land). The property details may optionally include the property location (e.g., the property address), a property service provider unique identifier (e.g., corresponding to a tokenization administrator), a property identifier (e.g., a proper name and/or a unique alphanumeric code), a name of an entity managing the property, and the number of tokens sold and/or minted for the property, unique blockchain wallet addresses for property token owners, and/or other data.

Figure 5C:
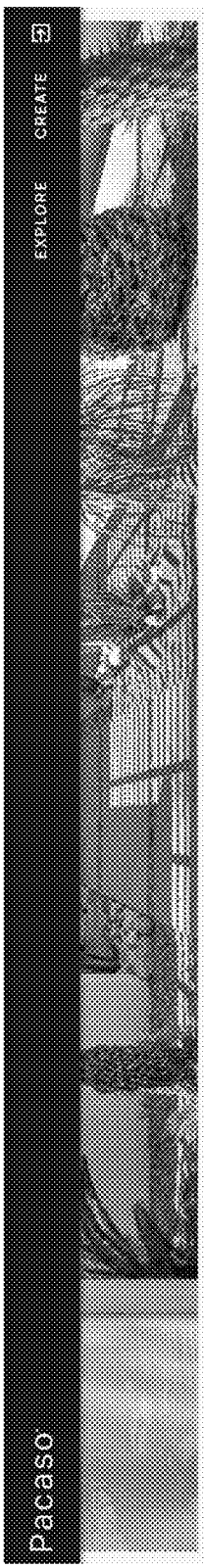

Optionally, in response to a user selecting the token field, data or link therein, the example token user interface illustrated in FIG. 5C may be presented. The token user interface may include some or all of the property details presented in FIG. 5B, a unique token ID for a token corresponding to a fractional share in the property or entity that owns the property (e.g., generated by the execution of a smart contract on a blockchain), a unique owner identifier (which may be generated by one or more of the disclosed systems), a token purchase price, and/or the percentage of the property (or shares therein) owned by the user by virtue of the token.

Figure 5D:

Optionally, in response to the user selecting a particular token (e.g., by selecting a Unit ID), the example token detail user interface illustrated in FIG. 5D may be presented. The token detail user interface may include some or all of the corresponding information presented in association with the Unit ID via the user interface illustrated in FIG. 5C (e.g., the property ID, the Unit ID, the token ID, the property ID service provider, the property ownership percentage, the property name, etc.). In addition, owner and transaction data may be presented, including a blockchain address associated with the token and/or user wallet, the Identity service provider code, the token purchase price, and the purchase date. Loan and other liens may be recorded against the token on the blockchain (or other distributed database). By way of example, such loan information may include a lender identifier, a loan amount, a loan interest rate, a loan term, and/or a loan type.

Figure 5E:
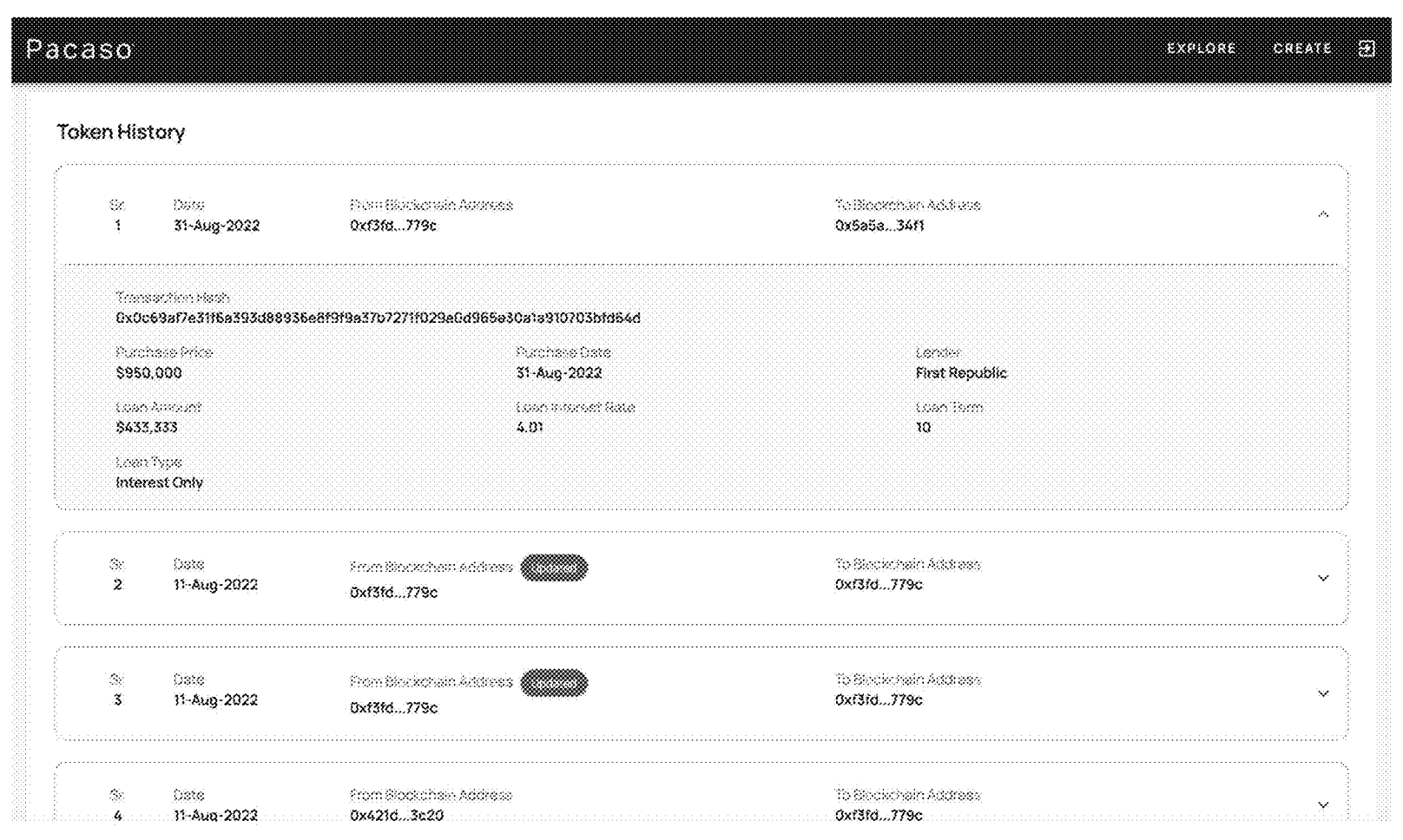

FIG. 5E illustrates an example token history user interface. The token history user interface provides information on each token transaction, such as a transfer, a loan, a lien, payment on a loan, and/or other recorded token transaction. For example, the transaction date, the originating blockchain address from which the token (or a right thereto) was transferred and a "to" blockchain of the recipient may be displayed. If the "from" and "to" block addresses are the same, this indicates that the token is not being transferred, but an interest (e.g., a loan or a lien for which the token acts as a security) in the token may be recorded. Similarly, payment towards a loan amount may be recorded as a transaction. The token history user interface may provide a transaction hash for a given transaction, a token purchase price, a purchase date, a lender name, a loan amount, the loan interest rate, a loan term, and/or the like.

Figure 5F:
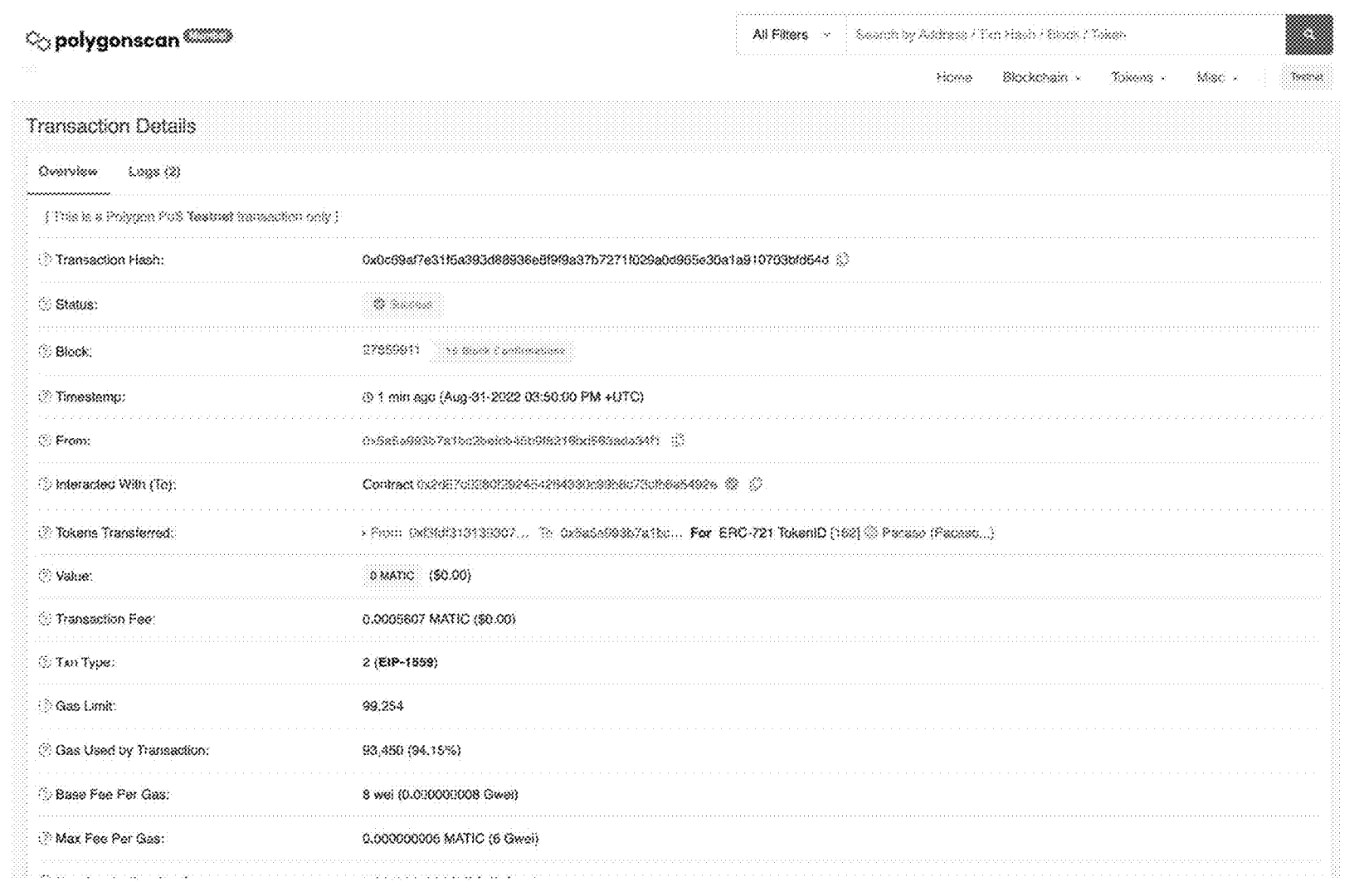

FIG. 5F illustrates an example transaction blockchain record that presents related information such as a transaction hash, status (e.g., failed, success), block number, a block confirmation, a timestamp, a from address, an interacted with/to address, token transfer data (e.g., a from address, a to address, for data (which may specify the token standard users, such as ERC-721 for an NFT, and an identification of a smart contract whose execution caused the transfer), token value (which may specify the amount in a specified token type and/or in U.S. dollars), the transaction fee (which may specify the transaction fee amount in a specified token type and/or in U.S. dollars), a txn (transaction) type, a fee limit (e.g., a maximum amount of gas (or energy) that the operator is willing to spend on a particular transaction), the amount of gas used by the transaction, a base fee per gas, and a maximum fee per gas.

Figure 5G:
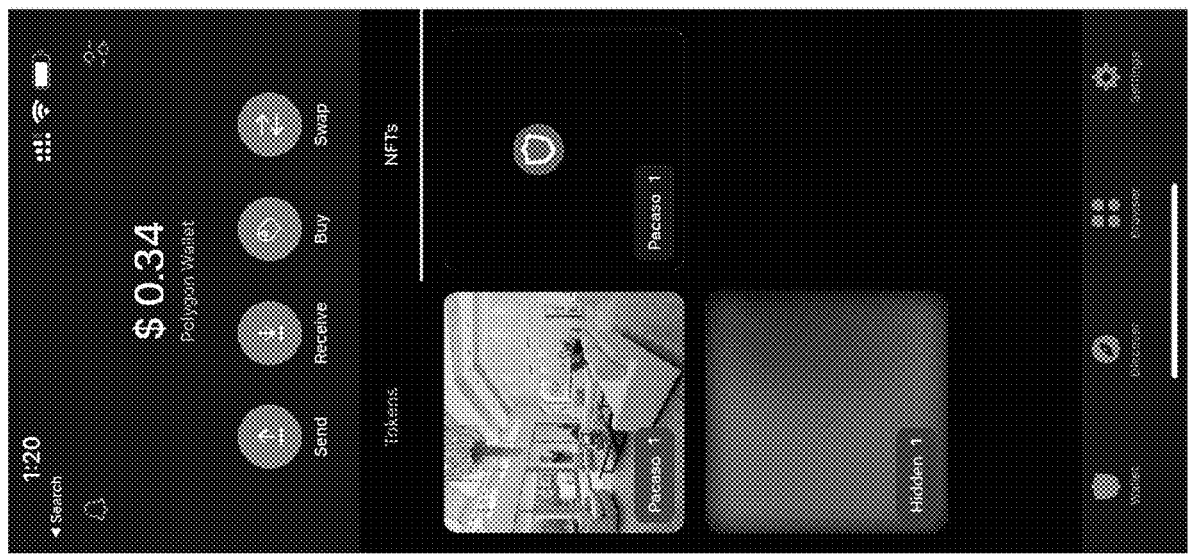

FIG. 5G illustrates an example token wallet user interface, which may correspond to a wallet view. The user interface may display images and real estate property identifiers of tokenized properties for which the user owns tokens in. The wallet may also indicate the funds and/or tokens in the user's token wallet. The token wallet may include controls that enable the user to send tokens in the wallet to a recipient, to receive tokens from a recipient, to purchase tokens from a token seller, and/or to swap tokens.

FIG. 5H illustrates an example property management administrative user interface. The user interface lists the properties in a table, including a property name, a property manager, and/or a property location. A control may be provided that enables tokens to be managed and assigned to users. A delete control is provided that enables a property listing to be deleted.

FIG. 5I illustrates an example non-fungible token (NFT) detail user interface that may be presented when a token (e.g., corresponding to ownership share in a property or in an entity that owns a property) is being transferred to a recipient (e.g., purchaser of a token providing an ownership interest in the property or in an entity that owns a property). An image of the property for which the token is being transferred may be presented. A smart contract address, a token identifier, a token standard, and/or a blockchain network may be presented. A send control is optionally provided that enables the NFT to be sent to a recipient.

Thus, systems and methods are described for securely storing, in a fault tolerant manner, data, such as encrypted data stored on a blockchain. An aspect of the present disclosure relates to selectively providing smart contracts with off-chain computer-resources to thereby providing enhanced computational performance and enhanced privacy.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone/mobile device application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A fault tolerant data storage management system configured to utilize a distributed synchronized database, the system comprising:
a network interface;
at least one processing device operable to:
generate a plurality of altcoins collateralized by housing unit assets;
instantiate a multilayer architecture comprising:
a settlement layer comprising a blockchain;
an asset layer comprising the plurality of altcoins collateralized by housing unit assets;
a protocol layers that provides standards for management of the altcoins collateralized by housing unit assets, the standards accessible by user-oriented applications:
an application layer comprising user-oriented applications that connect to respective protocols and execution layers;
receive over a network, using the network interface, from a client hosted on a system associated with a first entity a handshaking message comprising an identification of cipher suites supported by the client and a random byte string;

select a cipher suite from the cipher suites identified in the handshaking message;
generate an encryption key using the random byte string, wherein one or more messages from the fault tolerant data storage management system to the client are encrypted using the encryption key;
transmit a message to the client comprising an identification of the selected cipher suite, a session identifier, and a digital certificate;
receive over the network, using the network interface, an encrypted communication of the first entity from the client hosted on the system requesting an altcoin;
record a transfer of the altcoin on a distributed synchronized database to the first entity, wherein the distributed synchronized database is configured so that a single point of failure will not prevent access to data stored on the distributed synchronized database;
cause an electronic recording of a record of a transfer of resources from the first entity;
use the resources to enable a first user to obtain a right in a second entity, wherein the second entity possesses a first object;
generate a unique anonymous identifier for the first user;
record on the distributed synchronized database a certificate corresponding to the first user right in the second entity, the certificate comprising the unique anonymous identifier for the first user, a unique real property identifier, a unique transaction identifier, and a unique share identifier corresponding to a share in the second entity, wherein the second entity comprises a housing unit;
record a set of rules related to at least one transaction related to the first object;
request over a decentralized oracle network, off-chain data from an off-chain computer resource using a protocol converter configured to translate the request into a query language compatible with the off-chain computer resource, wherein the decentralized oracle network comprises a set of independent blockchain oracles that provide, over an encrypted network channel, data to the blockchain, where respective independent oracles in the decentralized oracle network independently retrieve data from an off-chain source and brings it on-chain;
at least partly in response to determining that a first rule is to be executed using the off-chain computer resource using a decentralized network comprising a plurality of independent nodes, cause the decentralized network comprising the plurality of independent nodes to access over an encrypted channel data used in executing the first rule, and cause the decentralized network comprising the plurality of independent nodes to execute the first rule wherein none of the nodes has access to all of the data used in executing the first rule enhancing data security.

2. The fault tolerant data storage management system as defined in claim 1, wherein the fault tolerant data storage management system is configured to utilize a trained learning engine comprising an input layer, an output layer, and a hidden layer to classify a risk factor associated with the first user.

3. The fault tolerant data storage management system as defined in claim 1, wherein the fault tolerant data storage management system is configured to utilize a trained learning engine comprising an input layer, an output layer, and a hidden layer to match the first user with a first service.

4. The fault tolerant data storage management system as defined in claim 1, wherein the fault tolerant data storage management system is configured to utilize a trained learning engine comprising a neural network, an expert system, a rules-based systems, and/or a support vector machine to classify the first user.

5. The fault tolerant data storage management system as defined in claim 1, wherein the encrypted channel uses asymmetric encryption, wherein a public key is used to encrypt data communicated over the encrypted channel and a private key is used to decrypt data communicated over the encrypted channel.

6. The fault tolerant data storage management system as defined in claim 1, wherein the encrypted channel uses symmetric encryption.

7. The fault tolerant data storage management system as defined in claim 1, wherein the first object is configured to be utilized by a plurality of users in a time displaced manner.

8. A computer implemented method, the method comprising:
creating a plurality of altcoins collateralized by housing unit assets;
instantiating a multilayer architecture comprising:
a settlement layer comprising a blockchain;
an asset layer comprising the plurality of altcoins collateralized by housing unit assets;
a protocol layers that provides standards for management of the altcoins collateralized by housing unit assets, the standards accessible by user-oriented applications:
an application layer comprising user-oriented applications that connect to respective protocols and execution layers:
receiving over a network, using a network interface, from a client hosted on a system associated with a first entity a handshaking message comprising an identification of cipher suites supported by the client and a random byte string;
selecting a cipher suite from the cipher suites identified in the handshaking message;
generating an encryption key using the random byte string, wherein one or more messages to the client are encrypted using the encryption key;
transmitting a message to the client comprising an identification of the selected cipher suite, a session identifier, and a digital certificate;
receiving over the network, using the network interface, an encrypted communication of the first entity from the client hosted on the system, the encrypted communication requesting a altcoin;
recording a transfer of the altcoin on a distributed synchronized database to the first entity;
electronically recording a transfer of resources from the first entity;
using the resources to enable a first user to obtain a right in a second entity, wherein the second entity controls a first object comprising a housing unit;
generating a unique identifier for the first user;
recording on the distributed synchronized database a certificate corresponding to the first user right in the second entity, the certificate comprising the unique identifier for the first user;
recording a set of rules related to at least one transaction related to the first object;

requesting over a decentralized oracle network, off-chain data from an off-chain computer resource using a protocol converter configured to translate the request into a query language compatible with the off-chain computer resource, wherein the decentralized oracle network comprises a set of independent blockchain oracles that provide, over an encrypted network channel, data to the blockchain, where respective independent oracles in the decentralized oracle network independently retrieve data from an off-chain source and brings it on-chain;

at least partly in response to determining that a first rule is to be executed using the off-chain computer resource using a decentralized network comprising a plurality of independent nodes, causing the decentralized network comprising the plurality of independent nodes to access over an encrypted channel data used in executing the first rule, and causing the decentralized network comprising the plurality of independent nodes to execute the first rule.

9. The computer implemented method as defined in claim 8, the method further comprising utilizing a trained learning engine comprising an input layer, an output layer, and a hidden layer to classify a risk factor associated with the first user.

10. The computer implemented method as defined in claim 8, the method further comprising utilizing a trained learning engine comprising an input layer, an output layer, and a hidden layer to match the first user with a first service.

11. The computer implemented method as defined in claim 8, the method further comprising utilizing a trained learning engine comprising a neural network, an expert system, a rules-based systems, and/or a support vector machine to classify the first user.

12. The computer implemented method as defined in claim 8, wherein the encrypted channel uses asymmetric encryption, wherein a public key is used to encrypt data communicated over the encrypted channel and a private key is used to decrypt data communicated over the encrypted channel.

13. The computer implemented method as defined in claim 8, wherein the encrypted channel uses symmetric encryption.

14. The computer implemented method as defined in claim 8, wherein the first object is configured to be utilized by a plurality of users in a time displaced manner.

15. Non-transitory computer readable memory having program instructions stored thereon that when executed by a computer system comprising a computing device cause the computer system to perform operations comprising:
generate a plurality of altcoins collateralized by housing unit assets;
instantiate a multilayer architecture comprising:
a settlement layer comprising a blockchain:
an asset layer comprising the plurality of altcoins collateralized by housing unit assets;
a protocol layers that provides standards for management of the altcoins collateralized by housing unit assets, the standards accessible by user-oriented applications;
an application layer comprising user-oriented applications that connect to respective protocols and execution layers;
receive over a network from a client hosted on a system associated with a first entity a handshaking message comprising an identification of cipher suites supported by the client and a random byte string;
select a cipher suite from the cipher suites identified in the handshaking message;
generate an encryption key using the random byte string, wherein one or more messages to the client are encrypted using the encryption key;
transmit a message to the client comprising an identification of the selected cipher suite, a session identifier, and a digital certificate to create an encrypted channel;
receive a communication, over the encrypted channel, of the first entity from the client hosted on the system requesting a altcoin;
record a transfer of the altcoin on a distributed synchronized database to the first entity;
cause an electronic recording of a record of a transfer of resources from the first entity;
use the resources to enable a first user to obtain a right in a second entity, wherein the second entity possesses a first object;
generate a unique identifier for the first user;
record on the distributed synchronized database a certificate corresponding to the first user right in the second entity;
record a set of rules related to at least one transaction related to the first object;
request over a decentralized oracle network, off-chain data from an off-chain computer resource using a protocol converter configured to translate the request into a query language compatible with the off-chain computer resource, wherein the decentralized oracle network comprises a set of independent blockchain oracles that provide, over an encrypted network channel, data to the blockchain, where respective independent oracles in the decentralized oracle network independently retrieve data from an off-chain source and brings it on-chain;
execute the set of rules using data obtained from the off-chain source, wherein if the set of rules is satisfied, a first action is performed.

16. The non-transitory computer readable memory as defined in claim 15, the operations further comprising utilizing a trained learning engine comprising an input layer, an output layer, and a hidden layer to classify a risk factor associated with the first user.

17. The non-transitory computer readable memory as defined in claim 15, the operations further comprising utilizing a trained learning engine comprising an input layer, an output layer, and a hidden layer to match the first user with a first service.

18. The non-transitory computer readable memory as defined in claim 15, the operations further comprising utilizing a trained learning engine comprising a neural network, an expert system, a rules-based systems, and/or a support vector machine to classify the first user.

19. The non-transitory computer readable memory as defined in claim 15, wherein the encrypted channel uses asymmetric encryption, wherein a public key is used to encrypt data communicated over the encrypted channel and a private key is used to decrypt data communicated over the encrypted channel.

20. The non-transitory computer readable memory as defined in claim 15, wherein the encrypted channel uses symmetric encryption.

21. The non-transitory computer readable memory as defined in claim 15, wherein the first object is configured to be utilized by a plurality of users in a time displaced manner.

* * * * *

UNITED STATES PATENT AND TRADEMARK OFFICE
CERTIFICATE OF CORRECTION

PATENT NO. : 12,386,859 B2  
APPLICATION NO. : 18/456224  
DATED : August 12, 2025  
INVENTOR(S) : Daivak Sunil Shah et al.

Page 1 of 1

It is certified that error appears in the above-identified patent and that said Letters Patent is hereby corrected as shown below:

In the Specification

Under Column no. 3, Line no. 45, replace "example process" with "example process.".

Under Column no. 3, Line no. 47, replace "user interfaces" with "user interfaces.".

Under Column no. 6, Line no. 40, replace "or off-chain" with "or off-chain.".

Under Column no. 10, Line no. 25, replace "reserve, Against which" with "reserve, against which".

Under Column no. 11, Line no. 10, replace "backed derivatives." with "backed derivatives,".

Under Column no. 19, Line no. 56, replace "a t×n (transaction)" with "a txn (transaction)".

In the Claims

Under Column no. 22, Claim 1, Line no. 59, replace "user-oriented applications:" with "user-oriented applications;".

Under Column no. 24, Claim 8, Line no. 33, replace "user-oriented applications:" with "user-oriented applications;".

Under Column no. 24, Claim 8, Line no. 36, replace "execution layers:" with "execution layers;".

Under Column no. 25, Claim 15, Line no. 52, replace "a blockchain:" with "a Blockchain;".

Signed and Sealed this  
Twenty-first Day of October, 2025

John A. Squires  
*Director of the United States Patent and Trademark Office*